(12) United States Patent
Berghegger (10) Patent No.: US 7,545,654 B2
(45) Date of Patent: Jun. 9, 2009

(54) CONTROL CIRCUIT FOR CURRENT AND VOLTAGE CONTROL IN A SWITCHING POWER SUPPLY

(75) Inventor: Ralf Schroder genannt Berghegger, Glandorf (DE)

(73) Assignee: Power Systems Technologies GmbH, Ostbevern (DE)

( * ) Notice: Subject to any disclaimer, the term of this patent is extended or adjusted under 35 U.S.C. 154(b) by 242 days.

(21) Appl. No.: 11/550,617

(22) Filed: Oct. 18, 2006

(65) Prior Publication Data

US 2007/0115696 A1 May 24, 2007

(30) Foreign Application Priority Data

Nov. 18, 2005 (DE) .................... 10 2005 055 160

(51) Int. Cl.
*H02M 3/335* (2006.01)
(52) U.S. Cl. .................... 363/21.16; 363/21.13
(58) Field of Classification Search .............. 363/21.16, 363/21.08, 21.13
See application file for complete search history.

(56) References Cited

U.S. PATENT DOCUMENTS

| | | | |
|---|---|---|---|
| 5,936,852 A * | 8/1999 | Weinmeier et al. ....... | 363/21.15 |
| 6,459,594 B1 | 10/2002 | Tsuji et al. | |
| 6,661,679 B1 | 12/2003 | Yang et al. | |
| 2004/0032752 A1 | 2/2004 | Kim et al. | |
| 2005/0134200 A1 | 6/2005 | Kawarazaki | |
| 2005/0219870 A1 | 10/2005 | Yang et al. | |

FOREIGN PATENT DOCUMENTS

WO 2004/082119 9/2004

* cited by examiner

*Primary Examiner*—Shawn Riley
(74) *Attorney, Agent, or Firm*—Robert G. Crouch; Marsh Fischmann & Breyfogle LLP (57) ABSTRACT

A control circuit and method for controlling the output voltage and/or the output current of a switching power supply. The control circuit includes a transformer with a primary-side and a secondary-side main winding and a primary-side switch for switching on and off the primary current through the primary-side main winding in response to a control signal of the control circuit. The control circuit also includes a primary-side auxiliary winding operable to induce a voltage pulse after the primary-side switch is turned off, and a sample and hold device for sampling and storing a level of the voltage pulse for generating a control variable.

33 Claims, 7 Drawing Sheets

(prior art)

CONTROL CIRCUIT FOR CURRENT AND VOLTAGE CONTROL IN A SWITCHING POWER SUPPLY

BACKGROUND OF THE INVENTION

1. Field of the invention

The present invention refers to a circuit for current and voltage control in a switching power supply controlled by the primary side. The switching power supply comprises a transformer with a primary-sided and secondary-sided main winding, wherein electrical energy pulses are transmitted from the primary side to the secondary side. A primary-side switch switches on and off a primary current through the primary-sided main winding. Furthermore, the invention refers to a method of controlling the output voltage and the output current in a switching power supply controlled on the primary side.

2. Description of the Related Art

The operation of electrical devices usually requires a precisely defined supply voltage so that these devices operate properly, wherein this supply voltage is in many cases independent of the mains voltage provided by the electricity network. Consequently, many electric devices, such as computers or television sets, comprise a power supply unit. Battery-supplied apparatus also have power supply units to keep the internal operating voltages constant independent of the charging condition of the battery.

The function of the power supply unit is the conversion of a supply voltage, mostly the mains voltage, into a higher or lower supply voltage required for the supply of the electrical devices. The power supply voltage is applied to a primary side of the power supply unit and the electric device is connected to a secondary side.

Furthermore, a direct ohmic connection between the electricity network system and the electrical device is not allowed for safety reasons. Thus, the primary and the secondary side are separated from one another galvanically so that the high alternating voltage of the electricity network cannot reach the electric devices. This is implemented by a transformer, which also transfers electrical energy from the primary side to the secondary side.

The output power must be controlled on the secondary side to enable a safe operation of the devices. The control required for this purpose can be implemented either on the primary side or on the secondary side, wherein different advantages and disadvantages are achieved. Power supply units controlled by the secondary side often do not have a galvanic separation between input and output. Consequently, these units are used where a galvanic separation already exists, such as in battery-operated apparatus.

The various embodiments disclosed herein refer to a switching power supply controlled on the primary side.

It is known that switching power supplies do internally not operate with the frequency of the alternating voltage of the electricity network, which in the European electricity network is at approx. 50 Hz, but at a higher clock frequency, which is usually above 20 kHz.

This increase of the frequency is carried out by the primary-sided switch, which may for instance be formed by at least one MOSFET. As an alternative, insulated gate bipolar transistors (IGBT) can also be used for this purpose. The required direct voltage is generated in a rectifier unit from the alternating voltage of the electricity network. Subsequently, the direct voltage is switched on an off with a predetermined frequency, whereby an alternating voltage with the respective frequency is produced.

The advantages of switching power supplies compared to conventional linearly controlled power supply units are the significantly higher frequency, by means of which the transformer is controlled internally. Since the required amount of windings of the transformer drops inversely proportional to the frequency, the copper loss can thereby be significantly reduced and the transformer required becomes significantly smaller. The power supply unit can be built with a lower weight and more compact, since the transformer used does no longer need to have a heavy iron core. Moreover, other components of the switching power supply can be built smaller which leads to a reduction in costs.

A disadvantage of switching power supplies are the audible noises that may be generated. The noise is on the one hand produced by the switching currents which have a significantly higher energy when the frequencies are higher.

On the other hand, noise is produced by the frequency-controlled control of the switching power supply. The reason for this is the fast switch on and off of the transformer, by which, if the frequency is in a frequency range audible by human beings, a humming or buzzing can be heard.

As already mentioned, the output shall be galvanically separated from the input, thus, the control of the transformer is implemented by the generated high-frequency alternating voltage. The transformer comprises at least one primary-sided and at least one secondary-sided main winding, which are magnetically coupled to one another. A switch on the primary-sided main winding is usually used to switch the current through the primary winding on and off. In this manner the electric energy is charged into the primary-sided main winding.

The required output power is output at the secondary-sided winding, wherein the energy of the primary-sided winding is transmitted after each charging to the secondary-sided winding.

Thus, energy pulses with a high clock frequency are taken from the electricity network through the primary-sided switch and are transmitted through magnetic coupling of the primary and secondary winding to the output. The actual transmission or conversion of the energy may take place at different points in time, according to which a distinction is made between blocking converter, flow converter and resonance converter.

In the following, only the case of the blocking converter shall be observed, in which during the blocking phase of the switch, i.e. if no current flows through the primary-sided main winding, the energy transmission from the primary side to the secondary side takes place.

If a direct voltage is to be generated as output voltage, as is the case in many consumers, such as household appliances, mobile telephones, PC and the like, the alternating voltage induced at the secondary winding must be converted into a direct voltage in an additional secondary-sided rectifier stage. A low pass filter smoothens the direct voltage additionally and therefore reduces waviness of the output voltage.

The control of the output power is usually implemented via a closed control loop, wherein it is the target to keep the output voltage constant under all operating conditions. A known solution for generating a control variable is the feedback by means of a primary-sided auxiliary winding, as is for instance shown in WO 2004/082119 A2. A voltage pulse is induced in the primary-sided auxiliary winding after switching off the primary-sided switch. This pulse is used to generate an auxiliary voltage, which is proportional to the output voltage. The control takes care that the voltage lies within the control range at the auxiliary winding. Since this information can only be gained during the blocking phase, i.e. during the time at which the switch is switched off, a sample holding circuit is included which holds the voltage value for pause times and flow phase.

The value of the auxiliary voltage forms the actual value and is compared to a reference voltage, which represents the target value. The difference between the actual value and the target value, i.e. the control deviation, influences the control of the primary-sided switch so that the energy transmitted can be adjusted. Mains fluctuations as well as changes of the load current are controlled by the control circuit.

Both the control of the frequency as well as the pulse width are determined by the switch control. The switch-on point in time defines the duration of the blocking phase and thus the frequency. The switch-off time determines the current flow duration and thus the pulse width that corresponds to the energy to be transmitted.

Figure 8:
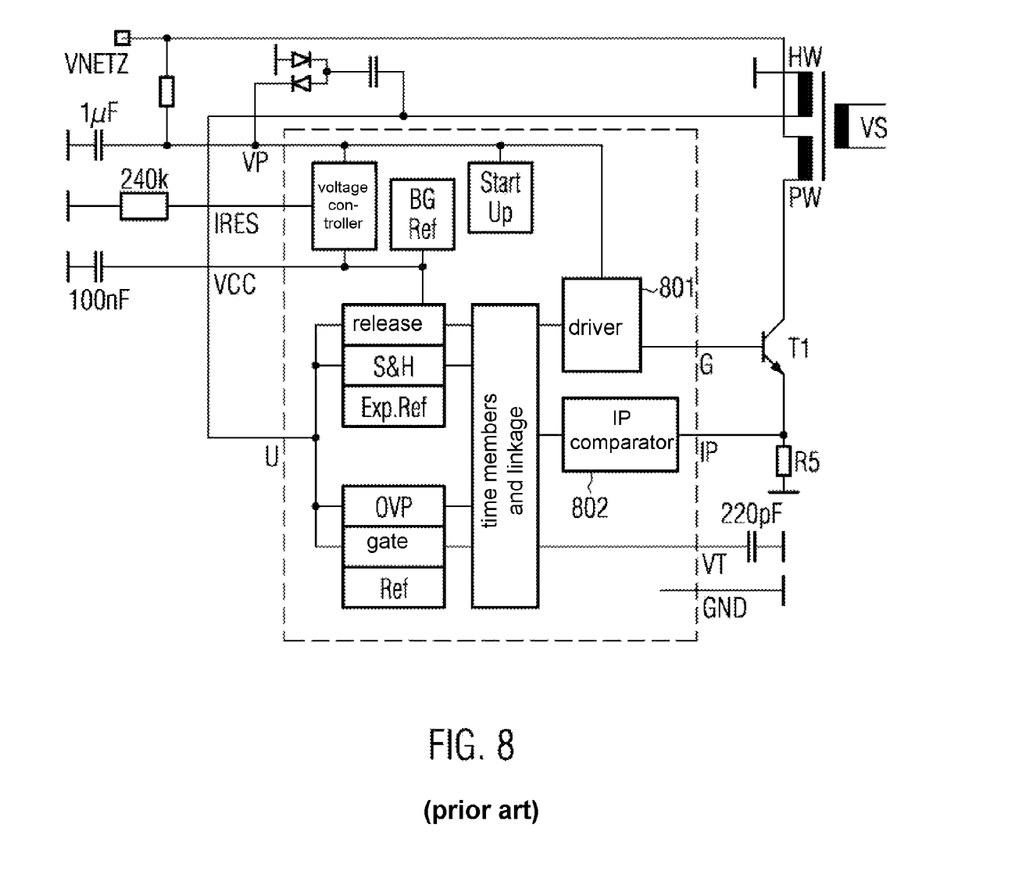
FIG. 8 shows a block diagram of a control circuit of the prior art.

A known control circuit for such a primary side controlled switching power supply can be derived from the published international patent application WO 2004/082119 A2. The structure of this known arrangement is shown in FIG. 8 and its function shall now be explained in detail.

The most important components include a transformer, which galvanically separates the primary and the secondary side and comprises a primary-sided PW and secondary-sided main winding VS. The two main windings are magnetically coupled so that electrical energy pulses can be transmitted from the primary side to the secondary side.

The energy flow in the primary-sided main winding is controlled by a primary-sided switch T1. By switching on and off the switch T1, the primary current may be switched off by the primary-sided main winding PW. The energy stored in the primary-sided main winding depends on the amount of current through the winding at the time of switch-off. The higher the current, the higher the stored energy that is subsequently transmitted to the secondary side.

The transmission of the energy pulse takes place during the blocking phase of the switch T1, that means at a time when no current flows through the switch and the primary-sided main winding. The switching of the transistor T1 is controlled by a driver 801, which is supplied by the supply voltage VP.

Additionally, the transformer has a primary-sided auxiliary winding HW, in which after switching off the primary-sided switch T1, a voltage pulse is induced. The induced voltage pulse at the auxiliary winding is proportional to the output voltage, wherein the output voltage depends on a load applying at the secondary side. The level of the induced voltage pulse at the auxiliary winding is used as control variable and controlled such that it lies within a control range.

Figure 6:
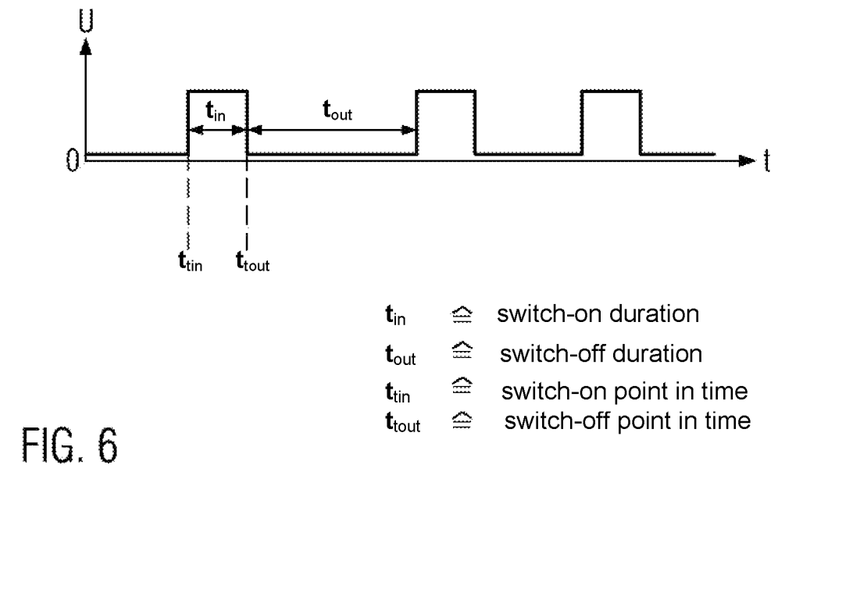
FIG. 6 shows the qualitative time course of a control signal for the primary-sided switch.

The actuator member for the control is formed by the transistor T1 and its switch-on and off point in time. FIG. 6 shows the course of the control signal G for the primary-sided switch T1 of the arrangement of FIG. 8. The switch-off duration $t_{out}$ and thus the clock frequency can be controlled by the switch-on point in time $t_{tin}$. The energy pulse width $t_{in}$ may be adjusted by the switch-off time $t_{tout}$ and thus the energy to be transmitted in the primary-sided main winding.

The switch-off point in time is determined by means of a primary current comparator 802. The primary current flowing through the primary-sided main winding PW and the transistor T1 also flows into the resistor R5, wherein the current causes a voltage drop at the resistor R5. This voltage drop is compared at the primary current comparator 802 to a fixed reference voltage. If the reference voltage is exceeded, the driver 801 switches the control signal G such that the transistor T1 is no longer conductive and blocks. The switch-off point in time in the prior art is therefore not influenced by the control variable at the primary-sided auxiliary winding so that the same energy quantity per pulse is transmitted.

The switch-on time is determined by the control variable. Since this information can only be gained during the blocking phase, i.e. when the switch is switched off, a sample and holding circuit S&H is included which holds the voltage value for pause time and flow phase.

The control variable influences the determination of the switch-on point in time of the primary-sided switch T1. The control variable is compared to a reference voltage Exp.Ref exponentially rising over the time. If the exponential reference voltage has reached the control variable, the transistor T1 is switched on and a current flows through the primary-sided main winding.

In the arrangement shown in reference WO 2004/082119 A2 the output voltage changes with the load applying at the secondary side. To compensate these changes, the clock frequency is increased or decreased. This takes place only through the blocking phase, i.e. through the switch-on point in time. The switch-off time always remains equal relative to the switch-on time and thus to the current flow duration.

When the load is low, less energy is consumed at the output side. Since per pulse the same energy is transmitted onto the output side, the clock frequency of the switch control must be decreased to transmit less energy. If the load applying at the output side rises again, the clock frequency is increased respectively, to provide a larger energy quantity at the secondary side.

As already mentioned, the problem exists in the known control circuit, that the output voltage depends on the load, since the frequency is adjusted depending on the deviation of the auxiliary voltage from the target value. When the load is low, the output voltage and corresponding therewith the auxiliary voltage at the auxiliary winding rises. With an increasing load the output voltage drops and thus the auxiliary voltage at the auxiliary winding drops correspondingly.

A further problem of the cited control circuit is that in the case of a low load energy-rich pulses with low frequencies are switched, wherein audible noise can be produced. A problem connected therewith is also the relatively large waviness of the output voltage.

A further problem is the susceptance to failure of the clock frequency control. In this control the voltage taken at the auxiliary winding is compared to an exponential reference to determine the time at which the switch is switched on again so that current flows in the winding. The reference voltage rises approximately according to a function $U\text{-ref} = k(1-e^{(-t/tau)})$ until it corresponds to the tapped voltage.

The output of the sample and holding device is kept constant for a short period of time during which the comparison with the exponential reference takes place.

The exponential reference voltage only slowly approximates to the auxiliary voltage kept constant especially when the switching times are longer. For a comparatively long period of time before the intersecting point of the exponential reference voltage with the output voltage kept constant, the difference between the reference and the output voltage is therefore small, which may lead to significant interferences of the determination of the time. This is shown as a curve 701 in FIG. 7.

SUMMARY OF THE INVENTION

An improved switch mode power supply may be provided, that is able to reduce the load dependency of the output voltage and generates less noise and features a less waviness of the output voltage. The improved switch mode power supply further is less susceptable to failure in the determination in time of the switch-on point in time In one embodiment a control circuit for controlling the output voltage and/or the output current in a switching power supply controlled by the primary-sided is provided, wherein the switching power supply comprises a transformer having a primary-sided and secondary-sided main winding. Electrical energy pulses are transmitted from the primary-sided to the secondary-sided main winding. A primary-sided switch is provided for switching on and off the primary current through the primary-sided main winding in response to a control signal of the control circuit. A primary-sided auxiliary winding is provided, in which after switching off the primary-sided switch a voltage pulse is induced, wherein the level of the voltage pulse depends on the load at the secondary side. Furthermore, a sample and holding device is provided for sampling and storing a level of the voltage pulse for generating a control variable, wherein the control signal is generated on the basis of the control variable. In addition, a primary current comparator determines a switch-off point in time of the primary-sided switch depending on the primary current. The control variable is fed back to the primary current comparator in a manner that the switch-off point in time of the primary-sided switch can additionally be influenced depending on the control variable in a manner that the time during which the primary current flows through the primary-sided main winding is reduced differently.

In another embodiment a control circuit for controlling the output voltage and/or the output current in a switching power supply controlled by the primary-sided is provided, wherein the switching power supply comprises a transformer having a primary-sided and secondary-sided main winding. Electrical energy pulses are transmitted from the primary-sided to the secondary-sided main winding. A primary-sided switch is provided for switching on and off the primary current through the primary-sided main winding in response to a control signal of the control circuit. A primary-sided auxiliary winding is provided, in which after switching off the primary-sided switch a voltage pulse is induced, wherein the level of the voltage pulse depends on the load at the secondary side. Furthermore, a sample and holding device is provided for sampling and storing a level of the voltage pulse for generating a control variable, wherein the control signal is generated on the basis of the control variable. In addition, a primary current comparator determines a switch-off point in time of the primary-sided switch depending on the primary current. The control circuit comprises an amplifier, wherein a non-inverting input of the amplifier is connected to an output of the sample and holding device, an output of the amplifier is connected via a feedback network with an inverting input of the amplifier, wherein the feedback network comprises a first resistor, a capacitor, which is connected in series with the first resistor, a second resistor, which is connected in parallel to the first resistor and the capacitor, and a third resistor, which is connected in series with the parallel connection from the first, the second resistor and the capacitor, and which is connected to ground.

According to another embodiment, a control circuit for controlling the output voltage and/or the output current in a switching power supply controlled by the primary-sided is provided, wherein the switching power supply comprises a transformer having a primary-sided and secondary-sided main winding. Electrical energy pulses are transmitted from the primary-sided to the secondary-sided main winding. A primary-sided switch is provided for switching on and off the primary current through the primary-sided main winding in response to a control signal of the control circuit. A primary-sided auxiliary winding is provided, in which after switching off the primary-sided switch a voltage pulse is induced, wherein the level of the voltage pulse depends on the load at the secondary side. Furthermore, a sample and holding device is provided for sampling and storing a level of the voltage pulse for generating a control variable, wherein the control signal is generated on the basis of the control variable. In addition, a primary current comparator determines a switch-off point in time of the primary-sided switch depending on the primary current. A correction network is connected between the primary-sided auxiliary winding and the sample and holding device such that the voltage generated from the voltage pulse at the primary-sided auxiliary winding rises depending on a load applying at the secondary side.

According to another embodiment, a control circuit for controlling the output voltage and/or the output current in a switching power supply controlled by the primary-sided is provided, wherein the switching power supply comprises a transformer having a primary-sided and secondary-sided main winding. Electrical energy pulses are transmitted from the primary-sided to the secondary-sided main winding. A primary-sided switch is provided for switching on and off the primary current through the primary-sided main winding in response to a control signal of the control circuit. A primary-sided auxiliary winding is provided, in which after switching off the primary-sided switch a voltage pulse is induced, wherein the level of the voltage pulse depends on the load at the secondary side. Furthermore, a sample and holding device is provided for sampling and storing a level of the voltage pulse for generating a control variable, wherein the control signal is generated on the basis of the control variable. The control circuit determines the switch-on point in time of the primary-sided switch by a comparison of the control variable with a comparator voltage and is further designed such that the comparator is determined depending on the control variable.

BRIEF DESCRIPTION OF THE DRAWINGS

The accompanying drawings are incorporated into and form a part of the specification for the purpose of explaining the principles of the invention. The drawings are not to be construed as limiting the invention to only the illustrated and described examples of how the invention can be made and used. Further features and advantages will become apparent from the following and more particular description of the invention, as illustrated in the accompanying drawings, wherein.

DETAILED DESCRIPTION OF THE INVENTION

The illustrative embodiments of the present invention will be described with reference to the figure drawings like elements and structures indicated by like reference numbers.

Figure 1:
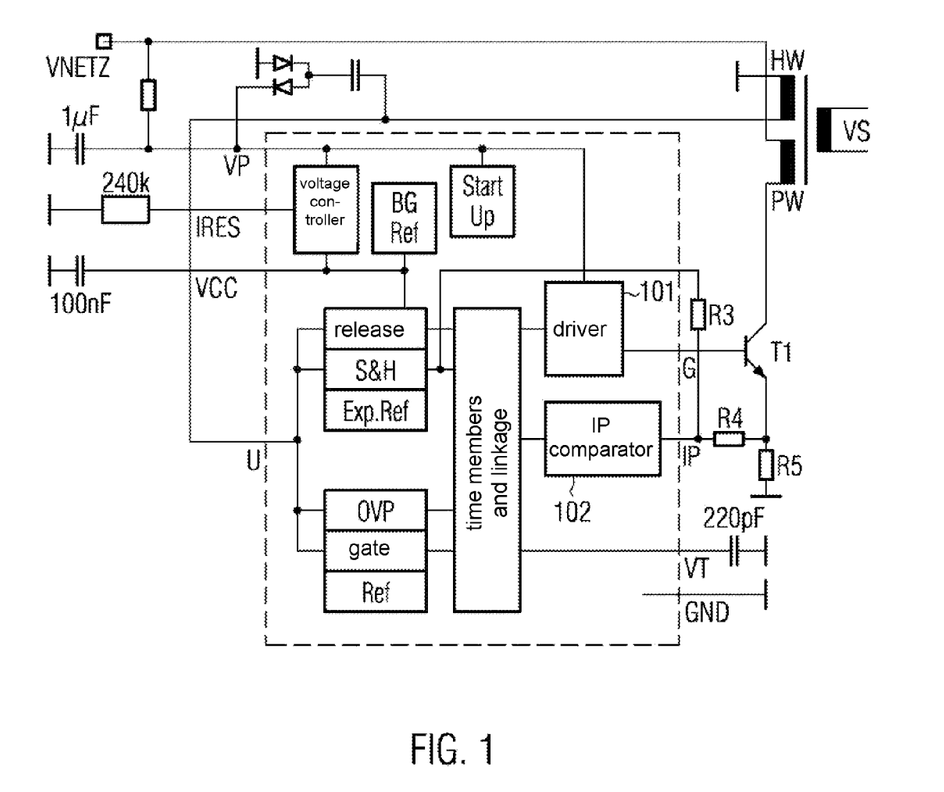
FIG. 1 shows a block diagram of a control circuit according to a first embodiment with a voltage divider in its application environment.

FIG. 1 shows a block diagram of a control circuit for controlling the output voltage and/or the output current in a switching power supply controlled by the primary side according to a first embodiment.

As explained above, the switch-off point in time of the transistor T1 in the control circuit according to reference WO 2004/082119 A2 is determined without influence from the control variable. The transmitted energy per pulse is therefore not dependent from the output voltage. To provide the required voltage at the output, the control can only set the clock frequency. If more energy is required, when a large load applies at the output, the frequency is increased. Accordingly, in the case of low load, the frequency is lowered again. In the case of low load, the same energy per pulse is transmitted as in the case of great load.

According to another aspect, the control variable and thus the information about a load applying at the secondary side, is fed back to the primary current comparator 102 so that the switch-off point in time of the transistor T1 can be influenced depending on the control variable. The switch-on duration $t_{on}$, which is determined by the switch-off point in time, can therefore be reduced depending on the load at the output.

A voltage divider, which has two resistors R3 and R4, influences the voltage applied at the primary current comparator 102 so that the reference voltage is reached earlier. Thus, the transistor is switched off earlier, with the consequence that less energy is stored in the primary-sided main winding. Since less energy is transmitted to the output, the control reacts thereon with an increase of the clock frequency at the switch.

If a low load applies at the output, the output voltage is high so that the auxiliary voltage tapped at the primary-sided auxiliary winding is also large, since this voltage corresponds to the output voltage. The auxiliary voltage applies via the sample and holding device S&H also at the first resistor R3 and at the second resistor R4. This additionally applied voltage, which becomes higher with the decreasing of the load at the output, increases the voltage applied at the primary current comparator 102, whereby the constant reference voltage of the primary current comparator is reached earlier.

An advantage achieved by this extension is that especially when the load is low, pulses with less energy are transmitted and the transmission takes place with a higher frequency. Thus, the load range in which the switching frequency is in the audible range, is smaller. Moreover, caused by the lower energy per pulse, less noise is generated. Moreover, the waviness of the output voltage is significantly reduced thereby.

In an advantageous embodiment, the control variable is first of all amplified before it is fed back via the voltage divider to the primary current comparator.

Figure 2:
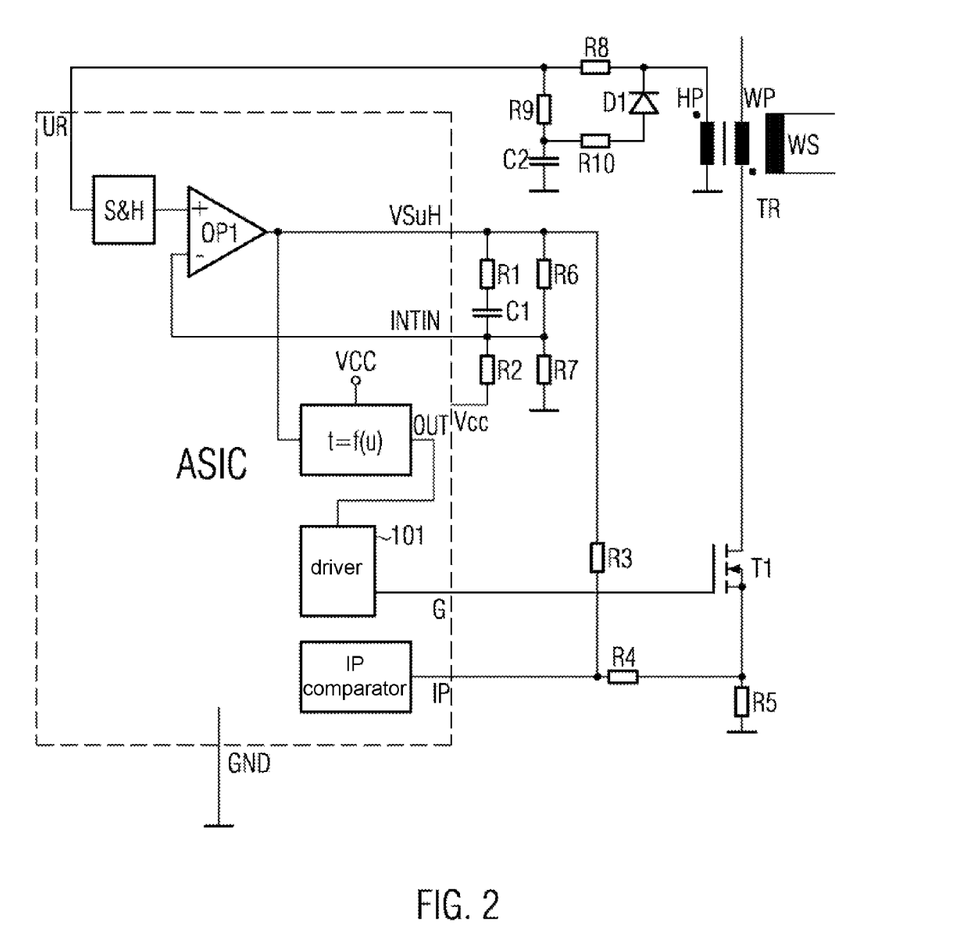
FIG. 2 shows a block diagram of a part of the control circuit according to a second embodiment.

For this purpose, an amplifier, in this case an operation amplifier, OP1 is used, as it can be seen in FIG. 2. An output of the operation amplifier OP1 is connected to a first terminal of the first resistor R3 and is connected via network with an inverting input of the operation amplifier OP1. A non-inverting input of the operation amplifier OP1 is connected to the output of the sample and holding device S&H.

A second terminal of the first resistor R3 is connected to an input of the primary current comparator 102 and to a first terminal of the second resistor R4. A second terminal of the second resistor R4 is connected to the primary current conducting terminal of the primary-sided switch T1 and with a first terminal of the resistor R5. A second terminal of the resistor R5 is connected to ground.

The network between the output and the inverting input of the operation amplifier OP1 determines the amplification of the operation amplifier OP1 and consists of four resistors R1, R2, R6, R7 and one capacitor C1. However, a person skilled in the art may also use other networks for determining the amplification.

A first terminal of the first resistor R1 is connected to an output of the operation amplifier OP1, to a first terminal of the third resistor R6 and to the first terminal of the first resistor R3 of the voltage divider. A second terminal of the first resistor R1 is connected to a first terminal of the capacitor C1. A second terminal of the capacitor C1 is connected to the inverting input of the operation amplifier OP1, to a first terminal of the second resistor R2, to a first terminal of the fourth resistor R7 and to a second terminal of the third resistor R6. A second terminal of the second resistor R2 is connected to a supply voltage Vcc. A second terminal of the fourth resistor R7 is connected to ground.

By inserting the additional amplifier OP1 downstream of the sample and holding device S&H and by the variable connection of the output as well as the inverting input of the operation amplifier OP1 it is possible to significantly reduce the load dependency of the control circuit.

The first resistor R1 is connected in series with the capacitor C1. The third resistor R6 is connected in parallel thereto. By the integrating behavior of the capacitor C1 the third resistor R6 which is in parallel thereto, can be dimensioned larger.

Thereby, the control amplification rises, whereby the load dependency of the voltage control is reduced and the control variable can be controlled more precisely.

Figure 3:
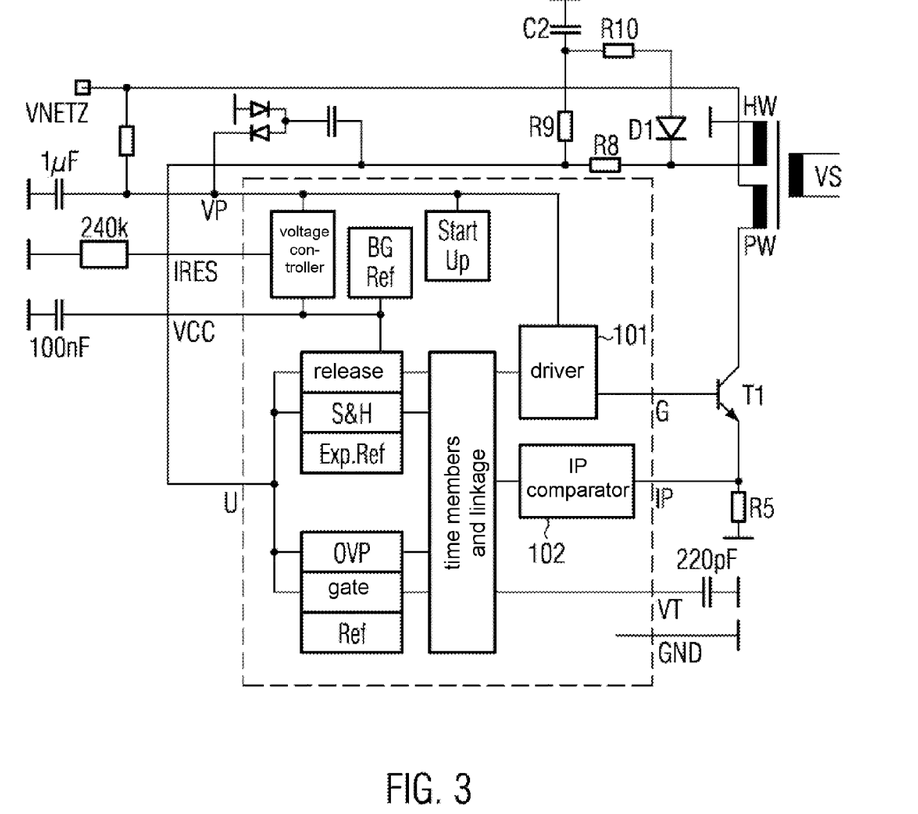
FIG. 3 shows a block diagram of a control circuit according to a further embodiment with a correction network.

Elements R8, R9, R10, C2 and D1 are treated within the framework of the explanation in respect to FIG. 3.

FIG. 3 shows a block diagram of a control circuit according to an embodiment with a correction network, as it is also included in FIG. 2 and the function of this correction network shall now be explained in detail.

A load on the secondary side causes a voltage drop at the secondary line, since caused by the internal resistance of the power during current flow, a voltage drop takes place. Thus, the output voltage becomes smaller than if current is not flowing.

The correction is connected between the primary-sided auxiliary winding HW and the sample and holding device S&H such that the voltage generated from the voltage pulse on the primary-sided measuring input (U) (=input of the sample and holding device S&H) rises depending on a load applying at the secondary side.

By the respective dimensioning of the correction network it is possible that the rise of the output voltage corresponds to the voltage drop at the secondary line caused by the load applying.

The advantage is that the output voltage is load-independent, since the correction network reduces the control variable according to the load applying.

The correction network comprises according to an advantageous embodiment at least one capacitor C2 and one resistor R8, wherein the voltage at the capacitor depends on the load, as well as a second and third resistor R9, R10 and a rectifier, e.g. a diode D1. The capacitor voltage reduces by the aid of the resistor the voltage applying at the primary-sided measuring input (U).

A first terminal of the first resistor R8 is connected to an input of the sample and holding device S&H, and a second terminal of the first resistor R8 is connected to the auxiliary winding HW. A first terminal of the second resistor R9 is connected to a first terminal of the first resistor R8 and a second terminal of the second resistor R9 is connected to a first terminal of the capacitor C2. A first terminal of the third resistor R10 is connected to a first terminal of the capacitor C2, and a second terminal of the third resistor R10 is connected to an anode terminal of the diode D1. A cathode terminal of the diode D1 is connected to the auxiliary winding HW and a second terminal of the capacitor C2 is connected to ground.

If the transistor T1 is switched on, a negative voltage is produced at the auxiliary winding HW, which leads to a current via the diode D1, the third resistor R10 and via the first resistor R8, the second resistor R9. The capacitor C2 is thereby charged negatively.

If the transistor T1 is switched off, a positive voltage at the auxiliary winding HW is first of all produced, which then drops to 0 V. Current cannot flow through the resistor R10 and the diode D1, since the diode D1 blocks. The capacitor C2 is discharged through the first resistor R8 and through the second resistor R9, which generates a voltage drop at the first resistor R8. The voltage at the first resistor R8 generated by the discharge of the capacitor C2, reduces the height of the voltage pulse when switching off the transistor T1. This reduction compensates in the case of a suitable dimensioning of the correction network elements the voltage drop at the secondary side by the load.

The voltage at the auxiliary winding HW rises, since the control adjusts the output voltage higher to compensate for the reduction of the voltage at the primary-sided measuring input and to reach the target value. The rise of the voltage at the auxiliary winding HW is therefore an indirect result of the reduction of the voltage at the primary-sided measuring input.

The switch-on duration of the transistor T1 during which the capacitor C2 is charged, is load-independent, since the switch-off time is determined independent of the control variable. The switch-off duration of the transistor T1, during which the capacitor C2 is discharged, is load-dependent, since the switch-on point in time is adjusted depending on the output voltage.

When the load is low, the clock frequency of the transistor T1 is low and thus the switch-off duration is long. In the case of a high load, the clock frequency of the transistor T1 is high and thus the switch-off duration is short.

The capacitor C2 is equally charged when the frequency is lower, but it is discharged longer, which is why the capacitor C2 carries a low load. The low load of the capacitor C2 corresponds to a low voltage drop at the first resistor R8.

In the case of high frequencies, when the load at the secondary side is high, the discharge time of the capacitor C2 is low, which consequently leads to a higher charge of the capacitor C2. The higher charge of the capacitor corresponds to a higher voltage drop at the first resistor R8.

Thus, the level of the voltage pulse at the primary-sided measuring input (U) at low load is only slightly lower and is significantly lower when the load is high.

Figure 4:
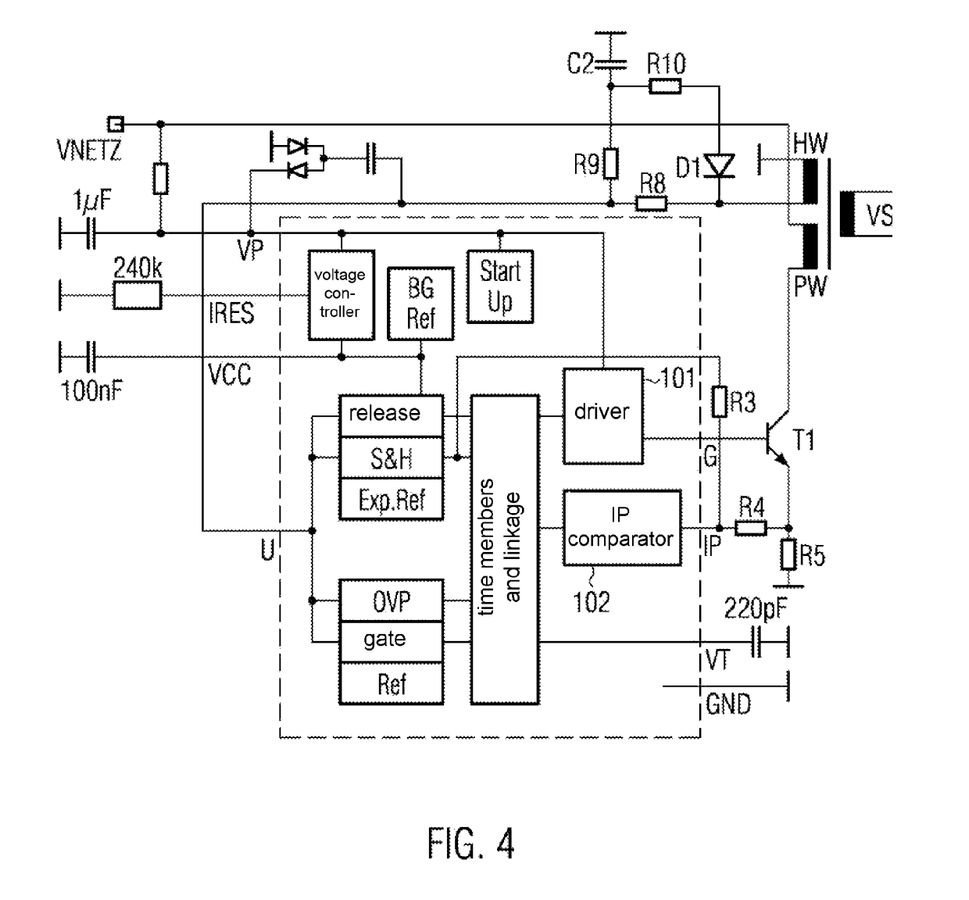
FIG. 4 shows a block diagram of a control circuit according to a further embodiment with a voltage divider and a correction network.

FIG. 4 shows a block diagram of a control circuit comprising a voltage divider R3, R4 and a correction network R8, R9, R10, Dl, C2, as described above.

The control circuit therefore both comprises a control, in which the switch-off point in time, i.e. the switch-on duration, depends on the output voltage, as well as a control at which the auxiliary voltage at the auxiliary winding HW, which is used as control variable, is independent of the load applying at the secondary side.

Figure 5:
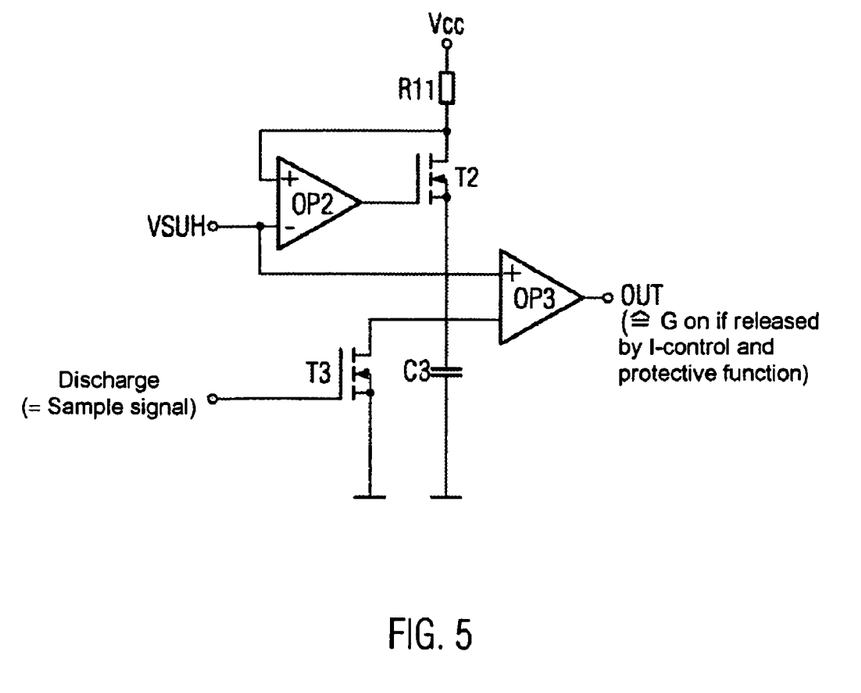
FIG. 5 shows a block diagram of a voltage-time converter.

FIG. 5 shows a block diagram of a voltage-time divider. The object of the voltage-time divider in the switching power supply is to determine a switch-on point in time for the primary-sided switch by the aid of the control variable.

In the prior art according to WO 2004/082119 A2 the control variable is compared to an exponentially rising reference voltage. The time at which both voltages are identical, is used as switch-on point in time of the transistor T1.

Figure 7:
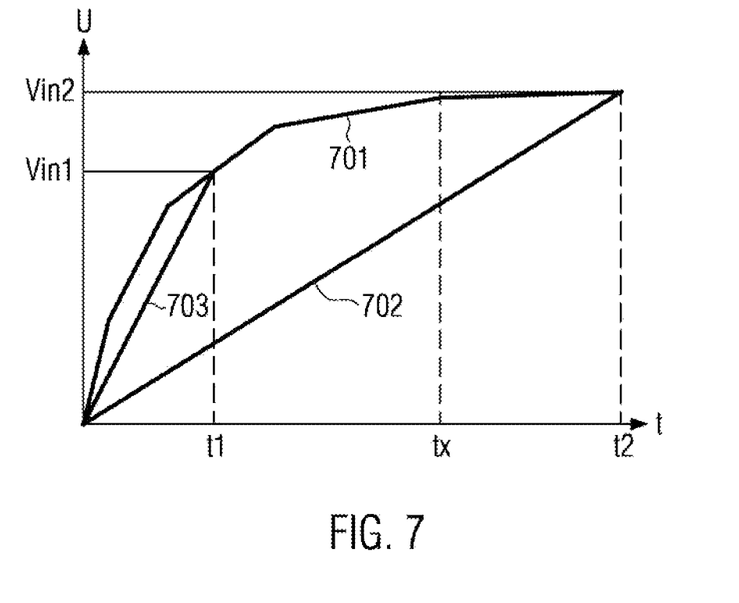
FIG. 7 shows a signal diagram of a voltage comparison within the voltage time converter.

A signal diagram of this voltage comparison is shown in FIG. 7. The voltage U is indicated above the time t. Two different input voltages Vin1 and Vin2 are indicated in the diagram.

The exponentially rising reference voltage 701, with which the input voltage is compared, corresponds to the prior art according to WO 2004/082119 A2.

The determination of the switch-on time is very susceptible to failure in such exponential reference voltages. For a long period of time before the two voltages are identical, the difference between the input voltage and the reference voltage is very small. Especially in high input voltages is this the case. Consequently, a small interference is sufficient to cause a great error in time in the determination of the switch-on time.

In the voltage-time converter in FIG. 5, the reference or comparator voltage is determined depending on the control variable. A capacitor C3 is charged, wherein the voltage at the capacitor C3 is used as comparator voltage. The charging of the capacitor C3 depends on the control variable.

The voltage-time converter also comprises a switch T2, which is implemented in FIG. 5 as a transistors. This transistor T2 is controlled by the input voltage and thus the current is determined through the transistor, which flows into the capacitor C3.

The voltage-time converter further comprises a first amplifier OP1, a second operation amplifier OP3, a second transistor T3 and a resistor R11.

The first amplifier OP2 is formed such that the control variable is amplified, wherein a non-inverting input of the first amplifier OP2 is connected to a collector input of the first transistor T2. An inverting input of the first amplifier is connected to the output of the sample holding device and with a non-inverting input of the second amplifier OP3.

An output of the first amplifier OP2 is connected to a base input of the first transistor T2. An emitter output of the first transistor T2 is connected to a first terminal of the capacitor C3.

The collector input of the first transistor T2 is also connected via a resistor R11 to a constant voltage source Vcc. The first terminal of the capacitor C3 is connected to an inverting input of the second amplifier OP3 and a collector input of a second transistor T3. An output of the second amplifier OP3 is connected to the driver 101 and therefore influences the control signal G of the primary-sided switch. A second terminal of the capacitor C3 and an emitter output of the second transistor T3 are connected to ground. A base input of the second transistor T3 is connected to an internal discharge signal.

The amplifier OP2 adjusts via its output voltage the current in the downstream connected transistor T2 such that the voltages at the non-inverting and inverting input of the amplifier OP2 are identical. Thus, the voltage at the non-inverting input is identical to the input voltage. The voltage at the resistor R11 results from the difference of the supply voltage Vcc and the input voltage. Since the supply voltage remains constant, the voltage at the resistor drops with an increasing input voltage.

The current flowing through the resistor R11 also flows through the transistor T2 into the capacitor C3 and charges same. Thus, the charging current of the capacitor C3 is smaller in the case of a large input voltage than if the input voltage is low. For a determined input voltage at the first amplifier, the charging current of the capacitor remains constant. The second amplifier OP3 compares the input voltage with the voltage applying at the capacitor C3. The transistor T3 discharges the capacitor C3 after a discharge signal to enable another determination of the switch-on time.

A linearly rising comparator voltage 702 results from this behavior, which can also be seen in FIG. 7. In the diagram, the linearly rising reference voltage is shown for the two input voltages Vin1 and Vin2 with different pitches (curves 702 and 703). The intersecting point of the two linearly rising reference voltages with the constant input voltages takes place at the time t1 or t2, respectively. This corresponds to the identical switch-on point in time for the exponentially rising reference voltage (curve 701).

The advantage of the linear comparator voltage is the low suspectance to failure of the time determination. This advantage can be seen in the diagram in FIG. 7. At the time tx, the distance between the constant input voltage Vin2 and the linear comparator voltage is significantly higher than the distance to the exponential comparator voltage. The interference must therefore be significantly larger in the new comparator voltage than in the exponential comparator voltage 701 to cause an identical time shortening.

The partial aspects according to the embodiments above are, as clear to the person skilled in the art combinable with one another in any manner, as can be seen from FIG. 2. The control circuit shown includes a voltage divider R3, R4, to feed back the control variable to the primary current comparator 102. Moreover, an amplifier is fed back via a feedback network to the sample and holding device S&H. Additionally, a correction network is connected between the auxiliary winding HW and the sample and holding device S&H. The improved voltage-time converter enables a determination of the switch-on point in time of the primary-sided switch T1 that is less susceptible to failure.

The various embodiments as described above may advantageously provide pulses with less energy especially when the load is low. Therefore, the clock frequency of the switch is increased. By the increase of the frequency and the reduction of the energy transmitted, both the operating noise is reduced and the waviness of the output voltage is reduced.

The control circuit of the above embodiments is furthermore designed such that it determines a switch-on point in time of the primary-sided switch depending on the control variable and therefore determines the time during which no primary current flows through the primary-sided main winding. Both the switch-off and the switch-on of the switch is controlled by the control circuit. No further control is required in this respect.

The feedback of the control variable may carried out according to another embodiment via a voltage divider, which can easily be realized by means of circuits.

In another embodiment, an amplification of the control variable before the feedback, prevents that the signal of the control variable is too weak.

In a further embodiment an operation amplifier is connected via a network in a manner that the network adjusts the amplification of the operation amplifier. Thus, the amplification can be dimensioned variably.

Moreover, the voltage divider may consist of two resistors, wherein a first terminal of the first resistor is connected to an output of the amplifier, and a second terminal of the first resistor is connected to an input of the primary current comparator and to a first terminal of the second resistor; and wherein a second terminal of the second resistor is connected to a primary-current conducing terminal of the primary-sided switch.

Due to the high amplification by the amplifier, a control variable can be controlled more precisely.

A further advantage of the embodiments may be that the load dependency of the output voltage can be reduced.

According to a further embodiment, the voltage is switched at a capacitor depending on a load applying at the secondary side, and the capacitor voltage reduces the voltage applying at the primary-sided measuring input terminal via a resistor.

According to another embodiment, the correction network comprises three resistors, one diode and one capacitor, wherein a first terminal of the first resistor is connected to the control circuit and a second terminal of the first resistor is connected to the auxiliary winding; wherein a first terminal of the second resistor is connected to a first terminal of the first resistor and a second terminal of the second resistor is connected to a first terminal of the capacitor; wherein a first terminal of the third resistor is connected to a first terminal of the capacitor, and a second terminal of the third resistor is connected to the anode terminal of the diode, wherein a cathode terminal of the diode is connected to the auxiliary winding, and wherein a second terminal of the capacitor is connected to ground.

A possible advantage of the above described embodiments may be that the suspeptance to failure is reduced in the determination of the switch-on point in time.

The control circuit of the above embodiments is further designed such that it has a primary current comparator, which determines a first switch-off point in time of the primary-sided switch depending on the primary current. Both the switch-on and switch-off of the switch is controlled by the control circuit. A further control in this respect is not required.

According to another embodiment, the comparator circuit is determined by charging a capacitor.

According to another embodiment, a transistor controls the charging of the capacitor.

Moreover, a first amplifier may be formed within the control circuit such that the control variable is amplified, wherein a non-inverted input of the first amplifier is connected to a collector input of the first transistor, an inverting input of the first amplifier is connected to the output of the sample holding device and to a non-inverting input of the second amplifier, an output of the first amplifier is connected to a base input of the first transistor, an emitter output of the first transistor is connected to a first terminal of the capacitor, the collector input of the first transistor is connected via a resistor to a constant voltage source, the first terminal of the capacitor is connected to an inverting input of the second amplifier and a connector input of a second transistor, an output of the second amplifier influences a control signal, a second terminal of the capacitor is connected to ground, an emitter output of the second transistor is connected to ground, and a base input of the second transistor is connected to an internal discharge signal.

While the invention has been described with respect to the physical embodiments constructed in accordance therewith, it will be apparent to those skilled in the art that various modification, variations and improvements of the present invention may be made in the light of the above teachings and within the purview of the appended claims without departing from the spirit and intended scope of the invention. In addition, those areas in which it is believed that those of ordinary skill in the art are familiar, have not been described herein in order to not unnecessarily obscure the invention described herein. Accordingly, it is to be understood that the invention is not to be limited by the specific illustrative embodiments, but only by the scope of the appended claims.

What is claimed is:

1. Control circuit for controlling the output voltage and/or the output current in a switching power supply controlled by the primary side, the switching power supply comprising:
   a transformer with a primary-sided (PW) and a secondary-sided (VS) main winding, wherein electrical energy pulses are transmitted from the primary-sided to the secondary-sided main winding,
   a primary-sided switch (T1) for switching on and off the primary current through the primary-sided main winding in response to a control signal (G) of the control circuit,
   a primary-sided auxiliary winding (HW), in which a voltage pulse is induced after switching off the primary-sided switch, wherein the level of the voltage pulse depends on a load at the secondary side,
   a sample and holding device (S&H) for sampling and storing a level of the voltage pulse for generating a control variable, wherein the control signal is generated on the basis of the control variable,
   wherein the control circuit comprises a primary current comparator (102), which determines a switch-off point in time of the primary-sided switch depending on the primary current, and
   the control variable is fed back to the primary current comparator such that the switch-off point in time of the primary-sided switch can be influenced additionally depending on the control variable such that the duration during which the primary current flows through the primary-sided main winding is reduced differently.

2. Control circuit as claimed in claim 1, which is designed such that it determines a switch-on point in time of the primary-sided switch depending on the control variable and thereby determines the duration during which no primary current flows through the main winding.

3. Control circuit as claimed in claim 1, wherein the control variable is fed back to the primary comparator via a voltage divider.

4. Control circuit as claimed in claim 1, wherein an output of the sample holding device is connected to an amplifier (OP1) such that the control variable is amplified before the feedback.

5. Control circuit as claimed in claim 4, wherein the amplifier is an operation amplifier, and an output of the sample and holding device is connected to a non-inverting input of the operation amplifier, an output of the operation amplifier is connected to a terminal of the voltage divider, and an inverting input of the operation amplifier is connected to a network.

6. Control circuit as claimed in claim 4, wherein the voltage divider consists of a first and a second resistor (R3, R4), wherein a first terminal of the first resistor (R3) is connected to an output of the amplifier, and a second terminal of the first resistor (R3) is connected to an input of the primary current comparator and to a first terminal of the second resistor (R4); and wherein a second terminal of the second resistor is connected to the primary current conducting terminal of the primary-sided switch.

7. Control circuit as claimed in claim 2, comprising an amplifier (OP1), wherein a non-inverting input of the amplifier is connected to an output of the sample and holding device (S&H), an output of the amplifier is connected via a feedback network to an inverting input of the amplifier, wherein the feedback network comprises a first resistor (R1), a capacitor (C1), which is connected in series with the first resistor, a second resistor (R6), which is connected in parallel to the first resistor (R1) and the capacitor (C1), and a third resistor (R7), which is connected in series to the parallel connection of the first, the second resistor and the capacitor, and which is connected to ground.

8. Control circuit as claimed in claim 2, wherein a correction network is connected between the primary-sided auxiliary winding and the sample and holding device (S&H) such that the voltage generated from the voltage pulse at the primary-sided auxiliary winding rises depending on a load applying at the secondary side.

9. Control circuit as claimed in claim 2, which is adapted such that it determines the switch-on time of the primary-sided switch (T1) by a comparison of the control variable with a comparator voltage, and is further adapted such that the comparator voltage is determined depending on the control variable.

10. Method of controlling the output voltage and/or output current in a power switching supply controlled by the primary side, the power switching supply comprising:
    a transformer with a primary-sided (PW) and a secondary-sided (VS) main winding, wherein electrical energy pulses are transmitted from the primary-sided to the secondary-sided main winding,
    a primary-sided switch (T1) for switching on and off the primary current through the primary-sided main winding in response to a control signal (G) of the control circuit, a primary-sided auxiliary winding (HW), in which a voltage pulse is induced after switching off the primary-sided switch, wherein the level of the voltage pulse depends on a load at the secondary side,
    a sample and holding device (S&H) for sampling and storing a level of the voltage pulse for generating a control variable, wherein the control signal is generated on the basis of the control variable,
    the method comprising the following steps,
      comparing the primary current with a reference to determine a switch-off point in time of the primary-sided switch depending on the primary current,
      feeding back the control variable to a primary current comparator to influence the switch-off time of the primary-sided switch in the step of comparison in a manner that the duration during which the primary current flows through the primary-sided main winding is reduced differently.

11. Method as claimed in claim 10, wherein in a further step a switch-on point in time of the primary-sided switch is determined depending on the control variable and thus the time duration during which no primary current flows through the primary-sided main winding.

12. Method as claimed in claim 10, wherein in a further step the control variable is amplified before it is fed back.

13. Control circuit for controlling the output voltage and/or the output current in switching power supply controlled by the primary side, the switching power supply comprising:
    a transformer with a primary-sided (PW) and a secondary-sided (VS) main winding, wherein electrical energy pulses are transmitted from the primary-sided to the secondary-sided main winding,
    a primary-sided switch (T1) for switching on and off the primary current through the primary-sided main winding in response to a control signal (G) of the control circuit,
    a primary-sided auxiliary winding (HW), in which a voltage pulse is induced after switching off the primary-sided switch, wherein the level of the voltage pulse depends on a load at the secondary side,
    a sample and holding device (S&H) for sampling and storing a level of the voltage pulse for generating a control variable, wherein the control signal is generated on the basis of the control variable, wherein the control circuit comprises a primary current comparator (102), which determines a switch-off point in time of the primary-sided switch depending on the primary current, the control circuit is designed such that it determines a switch-on point in time of the primary-sided switch depending on the control variable and thus defines the duration in which no primary current flows through the primary-sided main winding, the control circuit comprises an amplifier (OP1), wherein a non-inverting input of the amplifier is connected to an output of the sample and holding device, and an output of the amplifier is connected via a feedback network to an inverting input of the amplifier, and wherein the feedback network comprises a first resistor (R1), a capacitor (C1), which is connected in series with the first resistor, a second resistor (R6), which is connected in parallel to the first resistor (R1) and the capacitor(C1), and a third resistor (R7), which is connected in series to the parallel connection of the first, the second resistor and the capacitor and which is connected to ground.

14. Control circuit as claimed in claim 13, wherein the amplifier is an operation amplifier.

15. Control circuit as claimed in claim 13, wherein the control variable is fed back to the primary current comparator (102) such that the switch-off point in time of the primary-sided switch (T1) can be influenced additionally depending on the control variable in a manner that the time duration during which the primary current flows through the main winding is reduced differently.

16. Control circuit as claimed in claim 13, wherein a correction network is connected between the primary-sided auxiliary winding (HW) and the sample and holding device (S&H) such that the voltage generated from the voltage pulse at the primary-sided auxiliary winding rises depending on a load applying at the secondary side.

17. Control circuit as claimed in claim 13, wherein the control circuit determines the switch-on point in time of the primary-sided switch (T1) by comparison of the control variable with a comparator voltage, and is further adapted such that the comparator voltage is determined depending on the control variable.

18. Control circuit for controlling the output voltage and/or the output current in a switching power supply controlled by the primary side, the switching power supply comprising:
  a transformer with a primary-sided (PW) and a secondary-sided (VS) main winding, wherein electrical energy pulses are transmitted from the primary-sided to the secondary-sided main winding,
  a primary-sided switch (T1) for switching on and off the primary current through the primary-sided main winding in response to a control signal (G) of the control circuit,
  a primary-sided auxiliary winding (HW), in which a voltage pulse is induced after switching off the primary-sided switch, wherein the level of the voltage pulse depends on a load at the secondary side,
  a sample and holding device (S&H) for sampling and storing a level of the voltage pulse for generating a control variable, wherein the control signal is generated on the basis of the control variable,
  wherein the control circuit comprises a primary current comparator (102) which determines a switch-off point in time of the primary-sided switch depending on the primary current, and
  the control circuit is adapted such that it determines a switch-on point in time of the primary-sided switch depending on the control variable and thereby defines the duration in which no primary current flows through the primary-sided main winding,
  and wherein a correction network is connected between the primary-sided auxiliary winding and the sample and holding device such that the voltage generated from the voltage pulse at the primary-sided winding rises depending on a load applying at the secondary side.

19. Control circuit as claimed in claim 18, in which the correction network at least comprises a capacitor (C2) and a resistor (R8), wherein the voltage at the capacitor depends on a load applying at the secondary side and this capacitor voltage reduces via the resistor the voltage applying at a primary-sided measuring input.

20. Control circuit as claimed in claim 18, wherein the correction network comprises at least a first, a second and a third resistor, a diode and a capacity, wherein a first terminal of the first resistor (R8) is connected to the control circuit and a second terminal of the first resistor is connected to the auxiliary winding; wherein a first terminal of the second resistor (R9) is connected to a first terminal of the first resistor (R8) and a second terminal of the second resistor (R9) is connected to a first terminal of the capacitor (C2); and wherein a first terminal of the third resistor (R10) is connected to a first terminal of the capacitor (C2) and a second terminal of the third resistor (R1) is connected to an anode terminal of the diode (D1), and wherein a cathode terminal of the diode (D1) is connected to the auxiliary winding, and wherein a second terminal of the capacitor (C2) is connected to ground.

21. Control circuit as claimed in claim 18, wherein the control variable is fed back to the primary current comparator (102) in a manner such that the switch-off point in time of the primary-sided switch (T1) can be influenced additionally depending on the control variable in a manner that the duration during which the primary current flows through the primary winding is reduced differently.

22. Control circuit as claimed in claim 18, comprising an amplifier (OP1), wherein a non-inverting input of the amplifier is connected to an output of the sample and holding device (S&H), an output of the amplifier is connected to an inverting input of the amplifier via a feedback network, wherein the feedback network comprises a first resistor (R1), a capacitor (C1), which is connected in series with the first resistor, a second resistor (R6), which is connected in parallel to the first resistor (R1) and the capacitor (C1), and a third resistor (R7), which is connected in series to the parallel connection of the first, the second resistor and the capacitor, and which is connected to ground.

23. Control circuit as claimed in claim 18, wherein the control circuit determines the switch-on point in time of the primary-sided switch (T1) by comparison of the control variable with a comparator voltage, and is further designed such that the comparator voltage is determined depending on the control variable.

24. Method for controlling the output voltage and/or the output current in a switching power supply controlled by the primary side, the switching power supply comprising:
  a transformer with a primary-sided (PW) and a secondary-sided (VS) main winding, wherein electrical energy pulses are transmitted from the primary-sided to the secondary-sided main winding,
  a primary-sided switch (T1) for switching on and off the primary current through the primary-sided main winding in response to a control signal (G) of the control circuit, a primary-sided auxiliary winding (HW), in which a voltage pulse is induced after switching off the primary-sided switch, wherein the level of the voltage pulse depends on a load at the secondary side, a sample and holding device (S&H) for sampling and storing a level of the voltage pulse for generating a control variable, wherein the control signal is generated on the basis of the control variable, the method comprising the following steps:

comparing the primary current with a reference to determine a switch-off time of the primary-sided switch depending on the primary current,     determining a switch-on time of the primary-sided switch depending on the control variable, whereby the duration in which no primary current flows through the primary-sided main winding is determined,     increasing the voltage generated from the voltage pulse at the secondary auxiliary winding, depending on a load applying at the secondary side.

25. Control circuit for controlling the output voltage and/or the output current in a switching power supply controlled on the primary side, the switching power supply comprising:

a transformer with a primary-sided (PW) and a secondary-sided (VS) main winding, wherein electrical energy pulses are transmitted from the primary-sided to the secondary-sided main winding,     a primary-sided switch (T1) for switching on and off the primary current through the primary-sided main winding in response to a control signal (G) of the control circuit,     a primary-sided auxiliary winding (HW), in which a voltage pulse is induced after switching off the primary-sided switch, wherein the level of the voltage pulse depends on a load at the secondary side,     wherein the control circuit comprises a sample and holding device (S&H) for sampling and storing a level of the voltage pulse for generating a control variable, and wherein the control signal is generated on the basis of the control variable,     wherein the control circuit is designed such that it defines the switch-on point in time of the primary-sided switch depending on the control variable by comparison of the control variable with a comparator voltage and thereby defines the duration in which no primary current flows through the primary-sided main winding, and     wherein the control circuit is further designed such that the comparator voltage is determined depending on the control variable.

26. Control circuit as claimed in claim 25, wherein the control circuit additionally comprises a primary current comparator (102), which determines a switch-off point in time of the primary-sided switch depending on the primary current.

27. Control circuit as claimed in claim 25, wherein a capacitor (C3) is connected such that the comparator voltage is determined by charging the capacitor and the charging of the capacitor depends on the control variable.

28. Control circuit as claimed in claim 27, wherein the charging of the capacitor (C3) is controlled by a transistor (T2) depending on the control variable.

29. Control circuit as claimed in claim 26, in which a first amplifier (OP2) is formed within the control circuit in a manner that the control variable is amplified,     wherein a non-inverting input of the first amplifier is connected to a collector input of the first transistor (T2), an inverting input of the first amplifier is connected to an output of the sample and holding device and to a non-inverting input of a second amplifier (OP3), an output of the first amplifier is connected to a base input of the first transistor (T2), an emitter output of the first transistor (T2) is connected to a first terminal of the capacitor (C3),     the collector input of the first transistor (T2) is connected via a resistor to a constant voltage source,     the first terminal of the capacitor (C3) is connected to an inverting input of the second amplifier (OP3) and a collector input of a second transistor (T3),     an output of the second amplifier (OP3) influences a control signal (G),     a second terminal of the capacitor (C3) is connected to ground,     an emitter output of the second transistor (T3) is connected to ground,     and a base input of the second transistor (T3) is connected to an internal discharge signal.

30. Control circuit as claimed in claim 26, wherein the control variable is fed back to the primary current comparator (102) such that the switch-off time of the primary-sided switch (T1) can be influenced additionally depending on the control variable in a manner that the duration during which the primary current flows through the primary-sided main winding, is reduced differently.

31. Control circuit as claimed in claim 25, wherein the control circuit comprises a comparator (OP1), wherein a non-inverting input of the amplifier is connected to an output of the sample and holding device (S&H), an output of the amplifier is connected via a feedback network with an inverting input of the amplifier, wherein the feedback network comprises a first resistor (R1), a capacitor (C1), which is connected in series with the first resistor, a second resistor (R6), which is connected in parallel to the first resistor (R1) and the capacitor (C1), and a third resistor (R7), which is connected in series to the parallel connection of the first, the second resistor and the capacitor, and which is connected to ground.

32. Control circuit as claimed in claim 25, wherein a correction network is connected between the primary-sided auxiliary winding (HW) and the sample holding device (S&H) such that the voltage generated from the voltage pulse at the primary-sided auxiliary winding rises depending on a load applying at the secondary side.

33. Method of controlling the output voltage and/or the output current in a switching power supply controlled by the primary side, the switching power supply comprising:

a transformer with a primary-sided (PW) and a secondary-sided (VS) main winding, wherein electrical energy pulses are transmitted from the primary-sided to the secondary-sided main winding,     a primary-sided switch for switching on and off the primary current through the primary-sided main winding in response to a control signal (G) of the control circuit,     a primary-sided auxiliary winding, in which a voltage pulse is induced after switching off the primary-sided switch, wherein the level of the voltage pulse depends on a load at the secondary side,     a sample and holding device for sampling and storing a level of the voltage pulse for generating a control variable, wherein the control signal is generated on the basis of the control variable,     and wherein the method comprises the following steps:

comparing the control variable with a comparator voltage, wherein the comparator voltage is influenced by the control variable,     determining a switch-on point in time of the primary-sided switch depending on the result of the preceding step, whereby the duration is determined in which no primary current flows through the primary-sided main winding.

* * * * *